Dec. 27, 1927.

H. W. GEORGE

MICROSCOPE ATTACHMENT

Original Filed Sept. 3, 1925

1,654,369

Harry W. George
INVENTOR

BY Victor J. Evans
ATTORNEY

Patented Dec. 27, 1927.

1,654,369

UNITED STATES PATENT OFFICE.

HARRY W. GEORGE, OF BUFFALO, NEW YORK.

MICROSCOPE ATTACHMENT.

Application filed September 3, 1925, Serial No. 54,328. Renewed November 18, 1927.

This invention relates to a device for use with a microscope, the general object of the invention being to provide a chambered block adapted to be placed on the object slide of the microscope for receiving the liquids or other material to be examined, the chamber being so formed that air can circulate therein to keep the organisms in the liquids alive for a longer period of time than is otherwise possible.

Another object of the invention is to provide the block with several chambers so that different liquids can be examined at the same time, with means for permitting the liquids to be combined, when desired.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1:
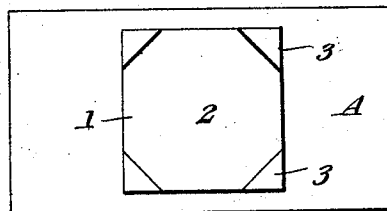
Figure 1 is a view showing the block placed upon an object slide of a microscope.
Figure 2:
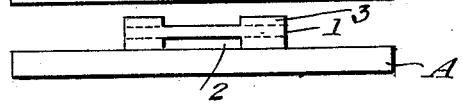
Figure 2 is an edge view of Figure 1.
Figure 3:
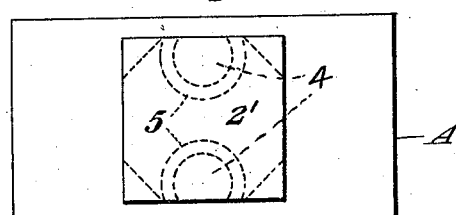
Figure 3 is a view similar to Figure 1, but showing a modification.
Figure 4:
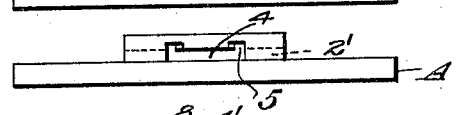
Figure 4 is an edge view of Figure 3.

In these views, the glass block 1 is formed with the corner supports 3 which provide the chamber or recess 2 when the block is placed upon the object slide A. The supports are preferably fused to the block and they may be of various colors. In the first form of the invention, the block has the supports on each face thereof and the supports on one face may be made of the same length as those on the opposite face or they may be made of different lengths. In the first case, the two chambers would be of the same depth but in the second case, they would be of different depths. In the second form of the invention shown in Figures 3 and 4, the supports are only on one face of the block with the top of the block parallel-plano. In this form, a pair of circular grooves 5 are formed in the top of the chamber so as to provide the spaces 4 which are separated from the space 2' of the chamber by the grooves 5. In this form, the device may be used as a one-piece counting chamber (haemacytometer). The microscopic net or scale could be placed on each space 4. In the form having the plain top, the device may be used as a reinforced cover glass and this form can be used as a counting chamber by placing it on a slide on which the net or scale has been cut.

Figure 5:
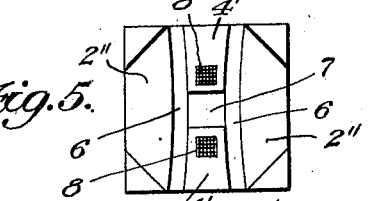
Figure 5 is a face view of a modified form of device.
Figure 6:
Figure 6 is an edge view of Figure 5.

In the form shown in Figures 5 and 6, slightly curved grooves 6 extend from one side of the block to the other and a central groove 7 connects the two grooves 6. Thus this device has its chamber formed with the spaces 4' and the spaces 2'', each space being separated from the other spaces and the surfaces of the spaces 4' may be provided with the net or scale 8. A cover plate 9 may be placed on the supports of the upper surfaces, with the lower supports resting upon a slide or stage of a microscope, thus preventing the bottom of the chamber from being scratched when the device is moved around. This device can also be used as a haemacytometer. In this form, the device can be fused into a celluloid or bakelite as a slide.

Figure 7:
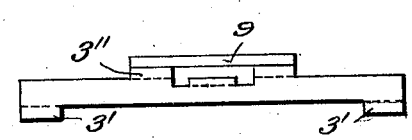
Figure 7 is an edge view of another modification.
Figure 8:
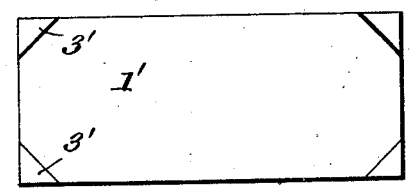
Figure 8 is a bottom plan view of Figure 7.

Figures 7 and 8 show the body of the device extended to form a large slide, the under supports 3' being arranged at the corners of the large body 1' and with the upper supports 3'' arranged adjacent the center of the large body so that they can support a small cover plate, such as shown at 9. This form of the device can be provided with the grooves or channels, as before described.

The device having curved gutters gives a wider space at the edge to drop the solution on without widening the space at the net or scale. The fuse supports resting on the slide or stage of a microscope, prevents the bottom polished surface of the chamber from being scratched when moved around. The microscopic net or scale is cut directly on the plain face of the block, the supports with curved gutters bridged by cover plates, forming the integral chamber. This avoids the most difficult operation (as in other chambers) of the cutting of the chamber below the surface of the slide and the regrinding and polishing of the same, and which cannot be made accurate. This will greatly reduce the cost of the device through its simplicity, and the device is of greater strength and easily cleaned.

This device will act as a combination chamber and cover glass, which, when placed upon a glass slide, will form a chamber to receive the liquid or other material to be examined under the microscope. Films of liquid are formed by touching the surface of the slide between the supports with the tip of a filled pipette.

The recesses can be made of various depths, so as to provide a chamber of a size to receive the proper thickness of film or object to be examined.

As air circulates between the block and slide, living organisms in the liquids being examined, will live for a longer time than they would otherwise. It will permit observation of materials containing living organisms without applying unnecessary pressure and the air increases the life of such organisms.

The equalized atmospheric pressure also eliminates air bubbles which are very bothersome in counting and examining liquids in close chambers.

When it is desired to compare two or more liquids or stained bacteria, the device is placed upon a glass slide and the liquid or stain in small portions is introduced in the chamber at opposite sides, so that four simultaneous observations can be taken.

When desired to observe the re-action between two or more liquids, the device having the gutters connecting two parts of the chamber together can be used, and when manipulating the device, the two liquids can be united; by separating the chamber into four parts by two circular gutters or channels, four different kinds of liquids can be examined, as above.

What I claim is:—

1. An attachment for a microscope comprising a glass block having a flat face and adapted to be placed on a glass slide or stage of a microscope and a support fused to each corner of the said face, such supports and face forming a chamber which opens out at each side of the block between a pair of the supports.

2. An attachment for a microscope comprising a glass block, a support fused to each corner thereof on each face thereof, the supports on each face forming a chamber which opens out on each edge of the block between a pair of the supports to permit free circulation of air.

3. An attachment for a microscope comprising a glass block having a flat face and adapted to be placed on a glass slide or stage of a microscope and a support fused to each corner of the said face, such supports and face forming a chamber which opens out at each side of the block between a pair of the supports, said flat face having grooves therein for dividing the chamber into sections.

4. An attachment for a microscope, comprising a glass block having upper and lower supporting legs at its corners to form a chamber in each face of the block, said legs being fused, a cover plate resting on the upper legs, the bottom of the upper chamber having grooves therein with the surfaces formed by said grooves having microscopic nets or scales thereon, the lower legs acting to prevent the lower chamber from being scratched when the device is moved about.

In testimony whereof I affix my signature.

HARRY W. GEORGE.